United States Patent
Simon et al.

(10) Patent No.: US 11,320,544 B2
(45) Date of Patent: May 3, 2022

(54) MULTI-SPECTRAL X-RAY DETECTOR

(71) Applicant: KONINKLIJKE PHILIPS N.V., Eindhoven (NL)

(72) Inventors: Matthias Simon, Aachen (DE); Hanns-Ingo Maack, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/965,942

(22) PCT Filed: Jan. 28, 2019

(86) PCT No.: PCT/EP2019/052011
§ 371 (c)(1),
(2) Date: Jul. 29, 2020

(87) PCT Pub. No.: WO2019/149663
PCT Pub. Date: Aug. 8, 2019

(65) Prior Publication Data
US 2021/0041582 A1   Feb. 11, 2021

(30) Foreign Application Priority Data

Feb. 2, 2018  (EP) .................................... 18154833

(51) Int. Cl.
*G01T 1/20* (2006.01)
*G01T 1/24* (2006.01)

(52) U.S. Cl.
CPC .......... *G01T 1/2002* (2013.01); *G01T 1/2018* (2013.01); *G01T 1/24* (2013.01)

(58) Field of Classification Search
None
See application file for complete search history.

(56) References Cited

U.S. PATENT DOCUMENTS 5,138,167 A * 8/1992 Barnes .................. G01T 1/2018
  250/363.02
10,120,084 B2 * 11/2018 Gibson ..................... G01T 1/20
(Continued)

FOREIGN PATENT DOCUMENTS

| DE | 102011089595 | 6/2013 |
| EP | 2395373 A2 | 12/2011 |
| WO | WO2012184589 A1 | 9/2014 |

OTHER PUBLICATIONS

PCT International Search Report, International application No. PCT/EP2019/052011, dated Mar. 26, 2019.

*Primary Examiner* — Edwin C Gunberg
(74) *Attorney, Agent, or Firm* — Larry Liberchuk

(57) ABSTRACT

Typically, a dual layer multi-spectral X-ray detector is capable of providing two points of spectral data about an imaged sample, because the front X-ray detector also acts to filter part of an incident X-ray spectrum before detection by a rear X-ray detector. A pre-filter can be placed in front of the front X-ray detector to enhance the spectral separation. However, the provision of a pre-filter implies that the intensity of the X-ray radiation must be increased to achieve the same signal to noise ratio. The present application concerns a multi-spectral X-ray detector with a front X-ray detector, a rear X-ray detector, and a structured spectral filter placed in-between them. The structured spectral filter has first and second regions configured to sample superpixels of the front X-ray detector, enabling three separate items of spectral information to be obtained per superpixel.

18 Claims, 9 Drawing Sheets

(56) References Cited

U.S. PATENT DOCUMENTS

2005/0012046 A1     1/2005  Groh
2011/0091009 A1     4/2011  Ikhlef
2014/0321616 A1*   10/2014  Gibson .................. G01N 23/04
                                                        378/62
2017/0115406 A1     4/2017  Li

* cited by examiner a)

b) c)

MULTI-SPECTRAL X-RAY DETECTOR

FIELD OF THE INVENTION

This invention relates generally to a multi-spectral X-ray detector, an X-ray imaging system, and a method for manufacturing a multi-spectral X-ray detector.

BACKGROUND OF THE INVENTION

In conventional multi-spectral X-ray detectors, two X-ray conversion layers are provided on top of each other. The detected signals are read out separately. A top X-ray conversion layer closest to the X-ray source typically absorbs low energy components of the X-rays. A bottom X-ray conversion layer positioned further from the X-ray source typically absorbs higher energy components of the X-ray spectrum emitted from the X-ray source.

Previous attempts to improve the separation of the high-energy X-ray spectrum and the low-energy X-ray spectrum have employed a structured filter positioned in front of a single layer X-ray detector. Such a filter enables a subset of pixels to receive a different X-ray spectrum, from which energy-separated images can be calculated. This approach is described in US 2014/0321616 A1. Such X-ray detectors can be further improved.

SUMMARY OF THE INVENTION

There may, therefore, be a need to provide an improved multi-spectral X-ray detector.

The object of the present invention is solved by the subject-matter of the independent claims. Further embodiments are incorporated in the dependent claims.

A multi-spectral X-ray detector comprising:

a first X-ray detector configured to receive incident X-ray radiation;

a structured spectral filter configured to receive intermediate X-ray radiation propagating out of the first X-ray detector; and a second X-ray detector axially aligned with the first X-ray detector and the structured spectral filter, and configured to receive filtered intermediate X-ray radiation propagating out of the structured spectral filter.

The first X-ray detector comprises a contiguous plurality of pixels forming a superpixel.

The second X-ray detector comprises a first plurality of pixels and a second plurality of pixels, each aligned to receive a portion of the filtered intermediate X-ray radiation having passed through the superpixel.

The structured spectral filter comprises a filter structure aligned with pixels of the superpixel, and comprising a first region aligned with the first plurality of pixels of the second X-ray detector, and a second region aligned with the second plurality of pixels of the second X-ray detector, wherein the first region is configured to alter the spectrum of the intermediate X-ray radiation incident on the first plurality of pixels of the second X-ray detector to form the filtered intermediate X-ray radiation.

The contiguous plurality of pixels forming the superpixel of the first X-ray detector are in alignment with at the first and the second pluralities of pixels of the second X-ray detector.

Accordingly, a multi-layer detector is provided that is able to discriminate between more than two parts of an incident X-ray spectrum. A conventional multi-layer (multi-spectral) X-ray detector typically detects low energy X-rays using a first (front) detector layer closest to the X-ray source, and high energy X-rays using a second (rear) detector layer behind the first detector layer. The scintillator material and substrate of the first X-ray detector act to filter the spectrum of the incident X-rays as they pass through the first X-ray detector.

According to the first aspect, pixels of the first detector layer detect a first X-ray spectrum. First and second groups of pixels of the second X-ray layer detect a second and third X-ray spectrum respectively, and are in alignment with superpixels of the first detector layer. For every superpixel of the first detector layer, there are at least two groups of pixels of the second detector. The first group of pixels is exposed to the filtered first X-ray spectrum (emerging from the rear of the first detector layer), and the second group of pixels is exposed to the filtered first X-ray spectrum, which has been further filtered by an element of a structured filter. Thus, the spectral information available to the multi-layer detector is first X-ray spectral information (detected in the first detector), the filtered first X-ray spectrum (detected in the first group of pixels of the second X-ray detector, and filtered at least by the first X-ray detector) and a further filtered first X-ray spectrum (detected in the second group of pixels of the second detector, and filtered by the structured filter).

Furthermore, at least three X-ray spectra per superpixel (of the first detector) are provided from the multi-layer detector in a way that avoids using a filter in front of the multi-layer detector. The use of a filter in front of a multi-layer detector leads to a general reduction in intensity of all X-ray radiation entering the multi-layer detector. According to the first aspect, a pre-detector filter is not required because the second X-ray detector in combination with the structured spectral filter spatially samples each superpixel of the first X-ray detector.

Optionally, the second region of the structured spectral filter is configured to alter the spectrum of the intermediate X-ray radiation directed towards the second plurality of pixels of the second X-ray detector differently to the alteration to the intermediate X-ray made by the first region of the structured spectral filter.

Accordingly, finer control over the spectrum of the X-ray radiation received by pixels of the second region of the second X-ray detector is provided, enabling better matching of the multi-layer X-ray detector to different material types in an imaged sample or image acquisition protocols.

Optionally, the first plurality of pixels of the second X-ray detector and second plurality of pixels of the second X-ray detector are coplanar.

Optionally, the structured spectral filter comprises a plurality of third filter regions, configured to alter the spectrum of the intermediate X-ray radiation incident on the structured spectral filter differently to the alteration made by the first and second regions of the structured spectral filter.

Accordingly, for each superpixel of the first X-ray detector, four different X-ray spectra are resolvable: (i) the incident X-ray spectrum arriving at the superpixel of the first X-ray detector, (ii) intermediate X-ray radiation filtered by the first filter region, (iii) intermediate X-ray radiation filtered by the second filter region, and (iv) intermediate X-ray radiation filtered by the third filter region. This enables more accurate calculation of the material characteristics of an imaged sample, because more channels having different frequency responses are established between the sample and the X-ray detector.

Optionally, the pixels of the superpixel of the first X-ray detector are configured to detect a primary X-ray spectrum.

The first plurality of pixels of the second X-ray detector are configured to detect a second X-ray spectrum using a pixel of the second X-ray detector aligned with the first region of the structured spectral filter, and to detect a third X-ray spectrum using a pixel of the second X-ray detector aligned with the second region of the structured spectral filter.

Optionally, the first region of the structured spectral filter has a different thickness to the thickness of the second region of the structured spectral filter.

Accordingly, an X-ray propagating through the first region will be perturbed to a different extent compared to an X-ray propagating through the second region, owing to their difference in thickness. Providing varying thicknesses of spectral filter material is an optional way to provide different X-ray spectra.

Optionally, the thickness of the first region of the structured spectral filter is in the range 0.05 mm to 0.7 mm, and the thickness of the second region of the structured spectral filter is in the range 0.2 mm to 2 mm.

Optionally, the structured spectral filter further comprises a planarization region having a low X-ray absorption relative to the first and second regions of the structured spectral filter, to equalize the outer thickness of the structured spectral filter.

Thus, a height difference in the structured spectral filter can be compensated for by applying a filling material to the structured spectral filter having a low X-ray absorption, facilitating easier mounting of the structured spectral filter within the detector.

Optionally, the planarization region comprises a polymer.

Optionally, the first regions of the structured spectral filter comprise a material having a different mass absorption coefficient to the material comprising the second regions of the structured spectral filter.

Accordingly, different materials having different X-ray spectrum transmission properties are provided in the structured spectral filter.

Optionally, material of the first and/or second regions comprises copper, silver, aluminium, or tin, or an alloy thereof.

Optionally, the structured spectral filter is fabricated (i) on a rear surface of the first X-ray detector, or (ii) wherein the structured spectral filter is fabricated (ii) on a front surface of the second X-ray detector.

Accordingly, manufacturing a multi-layer detector in which the structured spectral filter is integrated onto one or other faces of the stacked detectors leads to a reduction in bill of materials and assembly complexity.

Optionally, the first region is fabricated on a rear surface of the first X-ray detector, and the second region is fabricated on a front surface of the second X-ray detector.

Accordingly, it is possible to simplify the manufacturing process by requiring a first detector to be treated with a first material, and a second detector to be treated with a second material, in a pattern, which enables the subsampling of a superpixel when the first and second detectors are assembled.

According to a second aspect, there is provided an X-ray imaging system comprising:

An X-ray source configured to emit X-ray radiation towards a region of interest;

a multi-spectral X-ray detector according to the first aspect, configured to receive X-ray radiation which has passed through the region of interest; and an X-ray system control unit.

The X-ray system control unit is configured to activate the X-ray source, and to receive a first X-ray signal from the first X-ray detector, and a second X-ray signal from the second X-ray detector, and to generate a multi-spectral image of the region of interest.

Accordingly, an X-ray system capable of providing more detailed multi-energy X-ray information about a sample under X-ray examination is provided.

According to a third aspect, there is provided a method for manufacturing a multi-spectral X-ray detector comprising:

providing a first X-ray detector configured to receive incident X-ray radiation wherein the first X-ray detector comprises a contiguous plurality of pixels forming a superpixel;

providing a structured spectral filter configured to receive intermediate X-ray radiation propagating out of the first X-ray detector; and providing a second X-ray detector axially aligned with the first X-ray detector and the structured spectral filter configured to receive filtered intermediate X-ray radiation propagating out of the structured spectral filter;

wherein the second X-ray detector comprises a first plurality of pixels and a second plurality of pixels, both aligned to receive a portion of the filtered intermediate X-ray radiation having passed through the superpixel;

wherein the structured spectral filter comprises a filter structure aligned with pixels of the superpixel, and comprising a first region aligned with the first plurality of pixels of the second X-ray detector, and a second region aligned with the second plurality of pixels of the second X-ray detector, wherein the first region is configured to alter the spectrum of the intermediate X-ray radiation incident on the first plurality of pixels of the second X-ray detector to form the filtered intermediate X-ray radiation; and wherein the contiguous plurality of pixels forming the superpixel of the first X-ray detector are in alignment with at least the first and the second pluralities of pixels of the second X-ray detector.

Accordingly, it is possible to more efficiently manufacture a detector capable of providing more detailed multi-energy X-ray information about a sample under X-ray examination.

Optionally, there is provided multi-spectral X-ray detector comprising:

a first X-ray detector configured to receive incident X-ray radiation;

a structured spectral filter configured to receive intermediate X-ray radiation propagating out of the first X-ray detector; and a second X-ray detector axially aligned with the first X-ray detector and the structured spectral filter, and configured to receive filtered intermediate X-ray radiation propagating out of the structured spectral filter.

The first X-ray detector comprises a contiguous plurality of pixels forming a superpixel.

The second X-ray detector comprises a first plurality of pixels and a second plurality of pixels, each aligned to receive a portion of the filtered intermediate X-ray radiation having passed through the superpixel.

The structured spectral filter comprises a filter structure aligned with pixels of the superpixel, and comprises a first region aligned with the first plurality of pixels of the second X-ray detector, and a second region aligned with the second plurality of pixels of the second X-ray detector. The first region is configured to alter the spectrum of the intermediate X-ray radiation incident on the first plurality of pixels of the second X-ray detector to form the filtered intermediate X-ray radiation.

In the following text, the term "X-ray detector" refers to a device that generally functions to convert incident X-ray radiation into signals (electrical signals, data) capable of providing information about the internal structure of an object through which the X-ray radiation has passed. Typically, in multi-spectral imaging applications, the X-ray detector may be of the "direct conversion" or "indirect conversion" type. A typical "direct conversion" detector uses an X-ray photoconductor, such as amorphous selenium, to directly convert X-rays into an electrical charge. A typical "indirect conversion" X-ray detector comprises a scintillator and a photodiode array fabricated in a substrate, for example a silicon substrate. An X-ray striking a particular scintillator cell is converted into a flash of visible light, which is converted into an electrical charge when the visible light impinges on the silicon photodiode array. The structured spectral filter discussed in this application may be used with both a "direct conversion" or "indirect conversion" type detector.

In the following text, the term "incident X-ray radiation" implies a beam of X-ray radiation generated, for example, by a rotating anode X-ray that may pass through a patient or another object of interest in a medical or security scanner, and arrive at the first X-ray detector. The term "intermediate X-ray radiation" implies a beam of X-ray radiation that has passed through, and been perturbed (for example, spectrally) and/or attenuated, by the first X-ray detector. The term "filtered intermediate X-ray radiation" implies a beam of radiation having passed through the first X-ray detector and a structured spectral filter. The filtered intermediate X-ray radiation is incident upon a second X-ray detector.

In the following text, the term "contiguous" means sharing a common border, or touching.

In the following text, the term "configured to alter the spectrum" implies a material or assembly that adjusts the frequency (energy) spectrum of an incident X-ray beam. Such material could function to allow high-frequency (energy) X-rays to propagate with relatively little attenuation, but to strongly attenuate low-frequency (energy) X-rays, or vice versa. Materials, and/or combinations of materials could also be provided to generate a "band pass" and/or "band stop" X-ray energy (frequency) characteristic.

It is, therefore, proposed to use a structured spectral filter in-between two X-ray conversion layers. The structured spectral filter divides each superpixel into pixels, which undergo a different spectral filtration by different regions of the structured spectral filter, and are read-out separately. Therefore, more than two parts of the X-ray spectrum can be discriminated by the multi-spectral detector, based on the number of regions per superpixel provided in the structured spectral filter. For example, the structured filter can consist of different materials for each pixel, or different heights of the same material. In contrast to a pre-detector filter in combination with a single scintillator layer, the provision of a structured filter in-between at least two scintillator layers needs a smaller amount of absorbing material to achieve a similar spectral separation. Accordingly, the technique discussed in the present application provides much improved dose efficiency compared to the prior art pre-filter solution.

Although the present aspects are discussed with reference to a medical X-ray application, it will be appreciated that the technique is broadly applicable to many types of X-ray imaging, such as X-ray detectors used for baggage scanning, or non-destructive material analysis.

These, and other aspects of the present invention will become apparent from, and elucidated with reference to, the embodiments described hereinafter.

BRIEF DESCRIPTION OF THE DRAWINGS

Exemplary embodiments of the invention will be described in the following schematic drawings, which are not presented to scale.

DETAILED DESCRIPTION OF EMBODIMENTS

In order to discriminate X-ray energies in X-ray imaging it is common to use two X-ray conversion layers on top of each other and read out the signal of both layers separately. The top layer, facing the X-ray source, preferably absorbs the low-energy X-rays. The bottom layer absorbs mainly the higher energy parts of the X-ray spectrum. Conversion layers can be either scintillators (in the case of indirect conversion detectors) or semiconductors (in the case of so-called direct conversion detectors). The two layers can either be made of the same, or different material. Traditionally, the spectral separation (how different the absorbed part of the X-ray spectrum is before and after passing through the first detector) can be increased by providing an intermediate material (a spectral filter). As an example, a spectral filter may consist of a thin metal sheet.

Figure 1:
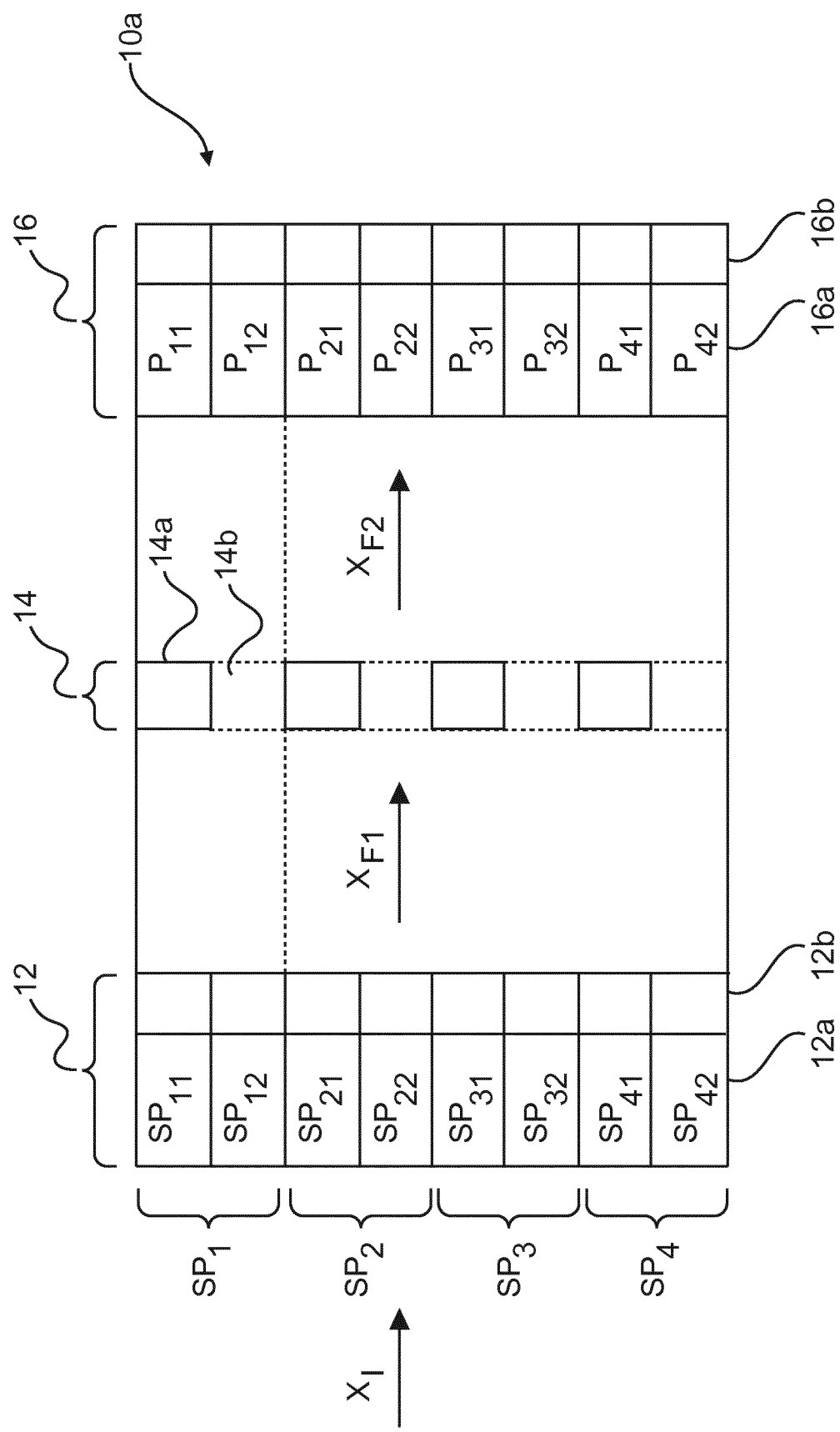
FIG. 1 illustrates a schematic side view of a multi-spectral X-ray detector according to the first aspect.

A disadvantage of a dual-layer detector is that it can only discriminate between two parts of the X-ray spectrum. The given separation might not be ideal for all possible applications and patients. A drawback of a traditional metal pre-detector filter is that it needs to absorb a significant portion of the impinging X-ray quanta to give a good spectral separation. With a pre-detector filter having different properties for different pixels (like a metal grid), there is a trade-off between spatial resolution against spectral resolution. FIG. 1 illustrates a side-schematic view of a multi-spectral X-ray detector according to the first aspect.

The multi-spectral X-ray detector $10a$ of FIG. 1 comprises:

a first X-ray detector 12 configured to receive incident X-ray radiation $X_I$;

a structured spectral filter 14 configured to receive intermediate X-ray radiation $X_{F1}$ propagating out of the first X-ray detector 12; and a second X-ray detector 16 axially aligned with the first X-ray detector and the structured spectral filter 14, and configured to receive filtered intermediate X-ray radiation $X_{F2}$ propagating out of the structured spectral filter 14. The first X-ray detector 12 comprises a contiguous plurality of pixels $SP_{11}$, $SP_{12}$ forming a superpixel $SP_1$. The second X-ray detector 16 comprises a first plurality of pixels $P_{11}$ and a second plurality of pixels $P_{12}$ each aligned to receive a portion of the filtered intermediate X-ray radiation having passed through the superpixel.

The structured spectral filter comprises a filter structure 14 aligned with pixels of the superpixel, comprising a first region 14a aligned with the first plurality of pixels of the second X-ray detector, and a second region 14b aligned with the second plurality of pixels of the second X-ray detector. The first region is configured to alter the spectrum of the intermediate X-ray radiation $X_{FI}$ incident on the first plurality of pixels $P_{11}$, $P_{12}$ of the second X-ray detector 16 to form the filtered intermediate X-ray radiation $X_{F2}$.

Although the illustrated version shows "indirect conversion" detectors having an array of scintillator cells 12a, 16a matched with respective arrays of detector pixels 12b, 16b (photodiodes or phototransistors, for example), the illustrated arrangement also applies to a "direct conversion detector" without loss of generality. Of course, a detector using a continuous scintillator material, where the pixels are defined by the positioning of the photodiodes is another optional implementation.

Superpixels $SP_1$, $SP_2$, $SP_3$, and $SP_4$ comprise a plurality of contiguous pixels $SP_{11}$, $SP_{12}$, $SP_{21}$, $SP_{22}$, $SP_{31}$, $SP_{32}$, $SP_{41}$, $SP_{42}$. Optionally, each superpixel represents the smallest unit of spatial (anatomical) resolution when imaging a patient. Thus, external read-out circuitry may combine (accumulate) signals received from $SP_{11}$, $SP_{12}$ to form the $SP_1$ read-out signal. The first X-ray detector 12 applies the same spectral adjustment (owing to the spectral absorption characteristic and similar sizes of the scintillator cells 12a) to X-ray radiation $X_I$ impinging on pixels $SP_{11}$, $SP_{12}$, $SP_{21}$, $SP_{22}$, $SP_{31}$, $SP_{32}$, $SP_{41}$, $SP_{42}$. Accordingly, read-out signals from pixels 12b represent and X-ray signal having a first X-ray filter characteristic.

In axial alignment with the first X-ray detector 12 is the structured spectral filter 14. The structured spectral filter 14 receives intermediate X-ray radiation $X_{FI}$ emerging from the rear of the first X-ray detector 12. In FIG. 1, the structured spectral filter 14 comprises a filter structure having a first region 14a and a second region 14b having different X-ray filter characteristics. The different characteristics may arise from the provision of the first 14a and second 14b regions as different materials, or as the same material with different thicknesses, or as an area of material absence (a cut) in one of the regions. Accordingly, the intermediate X-ray radiation $X_{FI}$ impinging on the structured spectral filter 14 is divided into a first portion having passed through the first region 14a, and a second portion having passed through the second region 14b.

Thus, the intermediate X-ray radiation $X_{FI}$ is spatially sampled by the first 14a and second 14b regions of the structured spectral filter 14. Optionally, the spatial sampling pattern repeats on a "per-superpixel" basis.

Thus, the filtered intermediate X-ray radiation is structured into portions having been filtered in different ways within each superpixel. The filtered intermediate X-ray radiation $X_{F2}$ propagates onwards towards the second X-ray detector 16. Although shown as a "indirect conversion" detector, the second X-ray detector 16 may also be provided as a "direct conversion detector". Furthermore, in an optional embodiment, a "indirect conversion" detector and "direct conversion" detector may be provided as the first and second X-ray detectors respectively, or vice-versa.

The second X-ray detector 16 comprises a first plurality of pixels $P_{11}$, $P_{21}$, $P_{31}$, $P_{41}$ aligned with the repeating pattern of first regions 14a of the structured spectral filter. Furthermore, the second X-ray detector 16 comprises a second plurality of pixels $P_{12}$, $P_{22}$, $P_{32}$, $P_{42}$ aligned with the repeating pattern of second regions 14b of the structured spectral filter. The first plurality of pixels $P_{11}$, $P_{21}$, $P_{31}$, $P_{41}$ receives filtered intermediate X-ray radiation having propagated out of the first region 14a of the structured spectral filter. The second plurality of pixels $P_{12}$, $P_{22}$, $P_{32}$, $P_{42}$ receives filtered intermediate X-ray radiation having propagated out of the second region 14b of the structured spectral filter.

The first region 14a of the structured spectral filter 14 applies a second X-ray filtering characteristic to the impinging intermediate X-ray radiation $X_{FI}$. The second region 14b of the structured spectral filter 14 applies a third X-ray filtering characteristic to the impinging intermediate X-ray radiation $X_{FI}$. However, because the intermediate X-ray radiation $X_{FI}$ impinging on the structured spectral filter 14 has already been filtered by the first X-ray filtering characteristic of the first X-ray detector 12, a first portion of the filtered intermediate X-ray radiation $X_{F2}$ having passed through the first region 14a of the structured spectral filter 14 has a spectral characteristic which is the combination of the first X-ray filtering characteristic and the second X-ray filtering characteristic. Likewise, a second portion of the filtered intermediate X-ray radiation $X_{F2}$ having passed through the second region 14b of the structured spectral filter 14 has a spectral characteristic which is the combination of the first X-ray filtering characteristic and the third X-ray filtering characteristic.

In operation, an incident X-ray beam is applied to the multi-spectral X-ray detector 10a. Read-out signals from pixels of the first X-ray detector 12b and pixels of the second X-ray detector 16b are provided corresponding to at least three X-ray energies per superpixel. Read-out pixel signals of $SP_1$($SP_{11}$, $SP_{12}$) are optionally combined into a common first read-out superpixel signal. Alternatively, it is not essential that the superpixel array of the first X-ray detector 12 comprises pixels having the same size as pixels of the second X-ray detector 16. For example, superpixel $SP_1$ could be provided as a single pixel with a much larger area than pixel $P_{11}$ of the second X-ray detector 16.

Accordingly, the read-out signals from the pixel array 12b of the first X-ray detector 12 represent the incident X-ray beam $X_I$ filtered according to the same first X-ray filtering characteristic. A second plurality of read-out signals is provided from the first plurality of pixels $P_{11}$, $P_{21}$, $P_{31}$, $P_{41}$ of the second X-ray detector 16 filtered according to a function of the first X-ray characteristic of the first X-ray detector combined with the second X-ray characteristic of the first region 14a of the structured spectral filter. A third plurality of read-out signals is provided from the second plurality of pixels $P_{12}$, $P_{22}$, $P_{32}$, $P_{42}$ of the second X-ray detector 16 filtered according to a function of the first X-ray characteristic of the first X-ray detector combined with the third X-ray characteristic of the second region 14a of the structured spectral filter. As such, the read-out signals of the second X-ray filter 16 represent a spatial subsampling of superpixel $SP_1$ at first and second X-ray energies.

It will be appreciated that this discussion can be extended without loss of generality to an X-ray detector of any size.

The arrangement described above is capable of providing at least three separate spectral energy measurements for each superpixel of the first X-ray detector 12, with a much lower dose impact. Of course, the pixels of the second X-ray detector 16a need not be of equal size, as illustrated.

Optionally, pixels receiving filtered intermediate X-ray radiation $X_{F2}$ from a region of the structured spectral filter 14 having a higher filtering magnitude may be sized 1.5, 2, or 2.5 times greater in area than pixels receiving filtered intermediate X-ray radiation $X_{F2}$ from a region of the structured spectral filter 14 having a lower filtering magnitude, to equalize signal-to-noise ratio, for example.

Accordingly, signals from the first $P_{11}$, $P_{21}$, $P_{31}$, $P_{41}$ and second $P_{12}$, $P_{22}$, $P_{32}$, $P_{42}$ sets of pixels of the second X-ray detector 16 may be read out separately and used to discriminate between different materials (such as bone and water).

In addition, pre-filtering of the impinging X-ray radiation $X_I$ is not required owing to the positioning of the structured spectral filter 14 in between the first X-ray detector 12 and the second X-ray detector 16, a lower overall dose of incident X-ray radiation $X_I$ is needed. Optionally, a pre-filter (for example, of metal) may be provided in front of the first X-ray detector.

Optionally, the first X-ray detector 12 absorbs substantially a low-energy part of the incident X-ray radiation $X_I$. Optionally, the second X-ray detector 16 absorbs substantially a high-energy part of the incident X-ray radiation $X_I$.

Optionally, the second X-ray detector 16 comprises substantially the same material as the material of the first X-ray detector 12.

FIG. 1 schematically illustrates each pixel $P_{11}$, $P_{12}$ of the second X-ray detector 16 having the same size as corresponding sections of the structured spectral filter 14a, 14b and corresponding pixels $SP_{11}$, $SP_{12}$ of the superpixel $SP_1$ of the first X-ray detector. However, in the approach discussed herein, the sizes of the first and second regions of the structured spectral filtered is not limited to this case.

For example, the first region 14a of the structured spectral filter 14 could be sized to cover a plurality of pixels of the second X-ray detector 16. For example, the first region 14a of the spectral filter could cover up to 9, 16, 25, 36, 49, or 64 pixels of the second X-ray detector. As an example, typically, X-ray detector pixels have a pitch of 0.143 mm. In this case, a first region 14a of the structured spectral filter covering about 49 pixels would have an area of one square millimetre.

Optionally, the pitch of the first region 14a and/or the second region 14b of the structured spectral filter is equal to the pitch of a first pixel $P_{11}$ and/or the second pixel $P_{12}$ of the second X-ray detector, respectively. Optionally, the pitch of the first region 14a and/or the second region 14b of the structured spectral filter is one, two, three, four, five, six or seven times the pitch of the first pixel $P_{11}$ and/or the second pixel $P_{12}$ of the second X-ray detector 16, respectively.

Of course, the first region 14a and the second region 14b of the structured spectral filter can have different pitches. This could be helpful in a situation where a first region 14a of the structured spectral filter 14 comprised a relatively highly absorbing material, compared to a second filter region 14b which was a cut-out (no filter), or had a very low absorption.

Optionally therefore, the first region 14a of the structured spectral filter may be equal in pitch to the second region of the structured spectral filter, or may be 1.5 times, 2 times, 2.5 times, 3 times, 4 times, 6 times, or 10 times greater in size compared to the second region 14b of the structured spectral filter.

Optionally, the second X-ray detector 16 could also be run in a "binning mode", with signals from a plurality of pixels of the second X-ray detector 16, such as a 3×3 grid, accumulated to form the read-out signal for that pixel "group" of the second X-ray detector 16. In that case, the first region 14a of the structured spectral filter would be sized to cover the "binned" 3×3 grid of pixels of the second X-ray detector.

Figure 2:
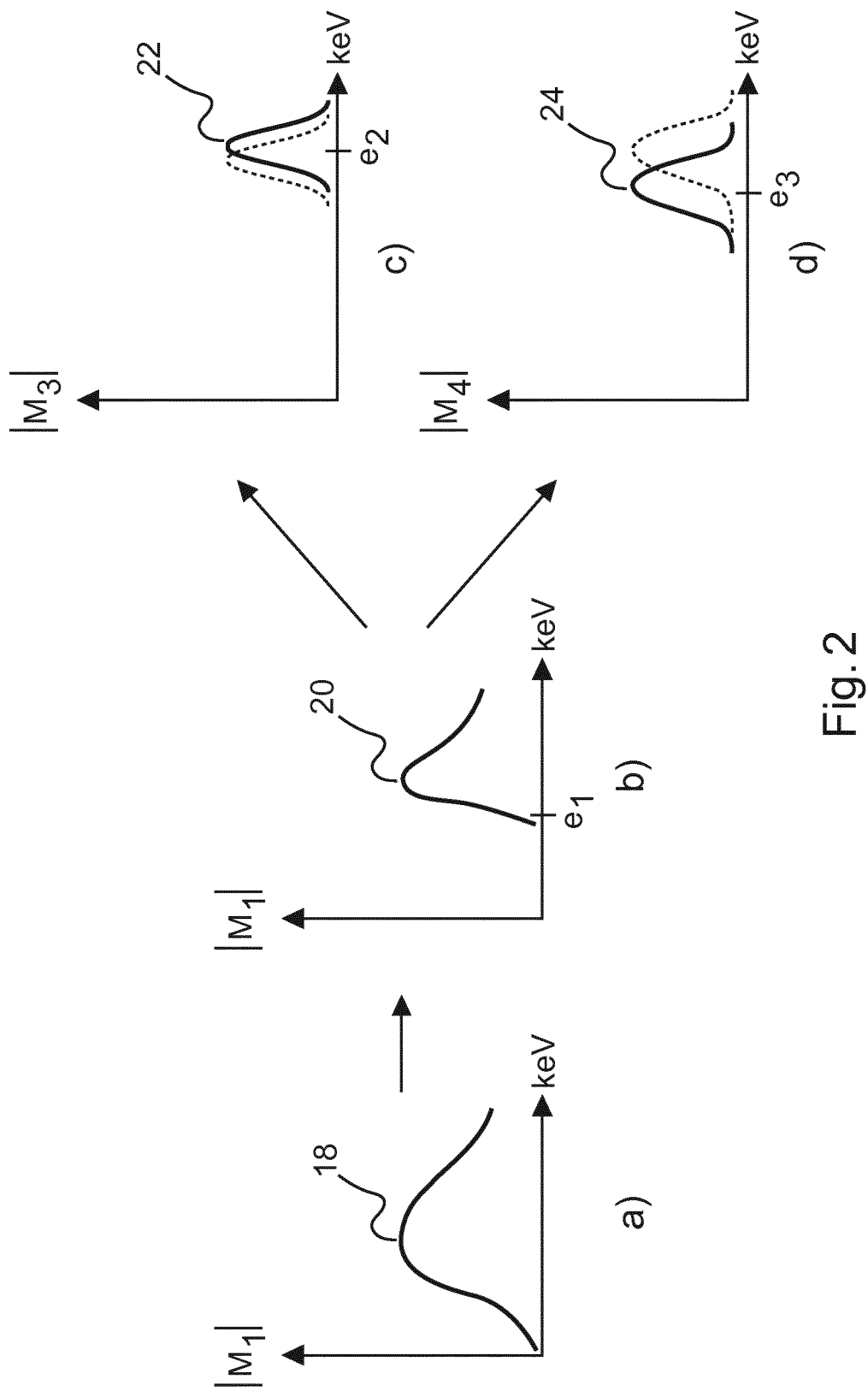
FIG. 2 illustrates an example of a set of four spectral characteristics obtained at various stages inside a multi-spectral X-ray detector according to the first aspect.

FIG. 2 illustrates an example of a set of four spectral characteristics obtained at various stages inside a multi-spectral X-ray detector according to the first aspect. The plots shown each give an impression of the spectral separation of the X-ray signal at various stages during its passage through the multi-spectral X-ray filter.

FIG. 2a) shows the spectral characteristic 18 of the incident X-ray radiation $X_I$ as standard medical X-ray radiation, having passed through a patient.

FIG. 2b) illustrates the intermediate X-ray radiation $X_I$ after the first X-ray detector 12. It can be seen that X-ray energy below $e_1$ keV has been substantially removed in accordance with a first filtering characteristic.

FIG. 2c) illustrates a first portion of the filtered intermediate X-ray radiation $X_{FI}$ after the first X-ray detector 12. It can be seen that higher X-ray energy centred on $e_2$ keV has passed through the first portion 14a of the structured spectral filter based on a combination of the first filtering characteristic and the second filtering characteristic.

FIG. 2d) illustrates a second portion of the filtered intermediate X-ray radiation $X_{FI}$ after the first X-ray detector 12. It can be seen that lower X-ray energy centred on $e_3$ keV has passed through the second portion 14b of the structured spectral filter based on a combination of the first filtering characteristic and the third filtering characteristic.

Accordingly, three sets of spectral information can be obtained from the same detector.

Turning to the construction of the structured spectral filter 14, many techniques and materials can be exploited to provide the spatial sampling of the superpixels.

Optionally, the structured spectral filter 14 may comprise a first region 14a made of a different material to a second region 14b. For example, different materials such as copper, silver, aluminium, tin, or alloys of these may be provided in the at least two regions.

Optionally, the first region comprises silver (Ag) and the second region comprises aluminium (Al), providing differentiation of the third and fourth X-ray spectrum.

Optionally, in the case of a structured spectral filter 14 having first and second regions of different heights, a planarisation layer, for example comprising PTFE or another polymer can be provided to facilitate mounting of the structured spectral filter 14.

Optionally, neighboring pixels in the second detector 16 having different filtration from the structured spectral filter 14 are grouped to correspond to superpixels of the first X-ray detector 12 in order to combine information from different absorbed spectra into one image. However, many patterns of pixel and structured spectral filter regions exist for a given superpixel.

Optionally, the number of pixels assigned to each superpixel is in the range 2 to 9.

Figure 3:
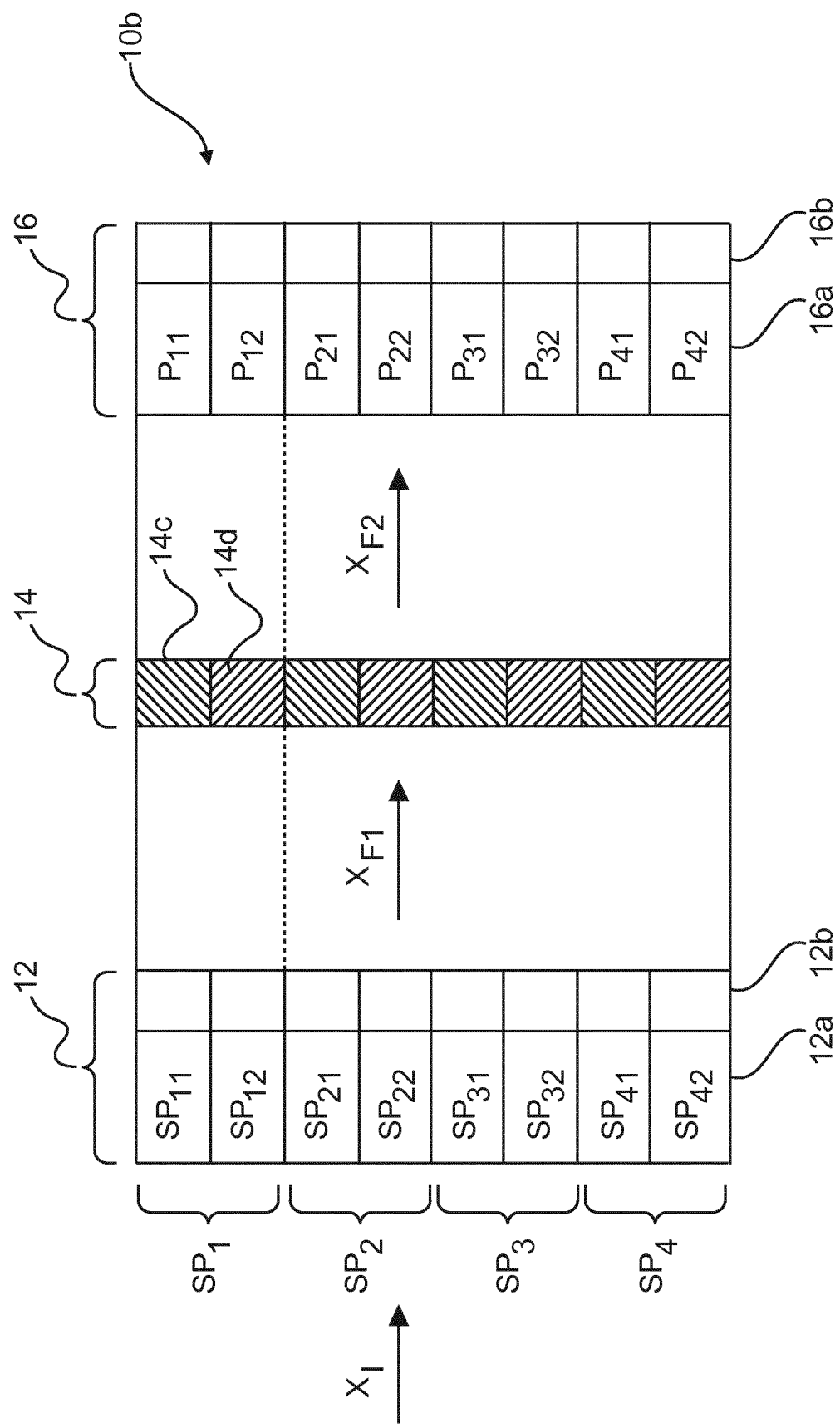
FIG. 3 illustrates a schematic side view of a multi-spectral X-ray detector according to an embodiment of the first aspect.

FIG. 3 illustrates a schematic side view of a multi-spectral X-ray detector 10b comprising a structured spectral filter 14 constituted from two different materials. A first region 14c of the structured spectral filter 14 is comprised of a first material. A second region 14d of the structured spectral filter 14 is comprised of a second material (shown by the opposed crosshatching pattern).

Thus, intermediate X-ray radiation $X_I$ impinging on the structured spectral filter 14 traverses the same linear distance across the structured spectral filter 14. However, because a first material comprised in the first region 14c may have a greater unit length X-ray absorption coefficient at a given frequency than a second material comprised in the second region 14c, the filtered intermediate X-ray radiation $X_{FI}$ is spatially sampled.

Of course, there is no limitation to the number of materials that may be included in the structured spectral filter 14, and each superpixel $SP_1$, $SP_2$, $SP_3$, and $SP_4$ may be spatially sampled by the structured spectral filter 14 to times, three times, four times, five times, or more in combination with an appropriate subdivision of pixels of the second X-ray detector 16.

Figure 4:
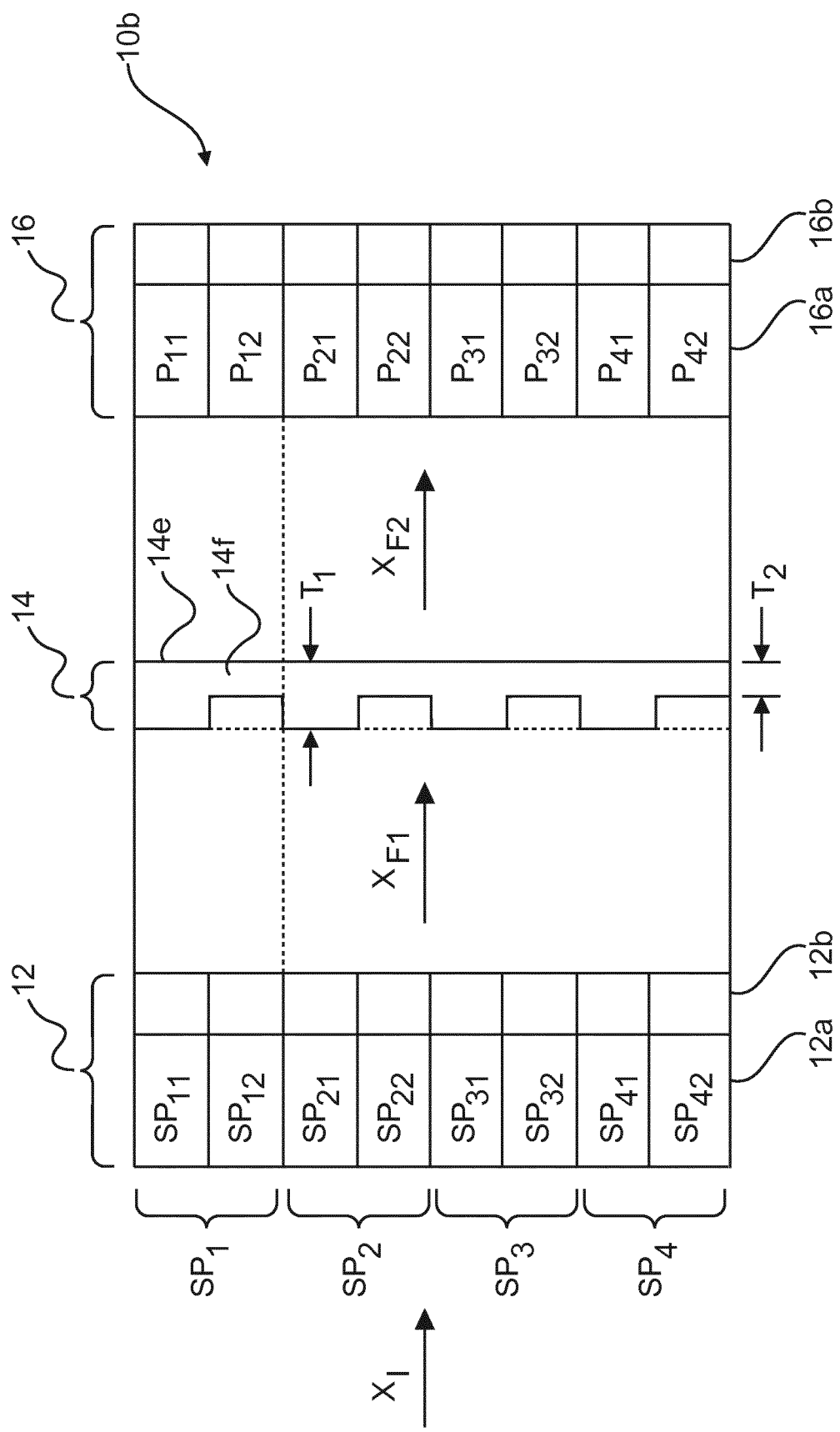
FIG. 4 illustrates a schematic side view of a multi-spectral X-ray detector according to an embodiment of the first aspect.

FIG. 4 illustrates a schematic side view of a multi-spectral X-ray detector 10c in which second and third spectral filtering characteristics are provided by providing the first 14e and second 14f regions of the structured spectral filter 14 as having different heights. Optionally, the structuring provides the first 14e and second 14f regions as the same material, each having a different height (in which case the second spectral characteristic of the first region 14e and the third spectral characteristic of the second region 14f will have the same shape, but a different linear Y-shift in the spectral domain).

Optionally, the structuring provides the first 14e and second 14f regions as a different material, each having a different height (in which case the second spectral characteristic of the first region 14e and the third spectral characteristic of the second region will have different shapes and a different linear Y-shift in the spectral domain dependent on the material properties).

Accordingly, the structured spectral filter 14 according to this option has a first region with a maximum outer thickness in the range of 0.7 mm to 2 mm and a second region 14f with a minimum outer thickness in the range 0.05 mm to 0.2 mm, although the skilled person will appreciate that the principle can be extended to other ranges dependent upon the materials used and desired performance.

It will be appreciated that the structured spectral filter 14 is arranged in-between the first X-ray detector 12 and the second X-ray detector 16, although a range of different constructional techniques may be employed to achieve this. As illustrated, for example in FIG. 1, the structured spectral filter 14 may be provided as a discrete insert for positioning in-between the first X-ray detector 12 and the second X-ray detector 16.

Optionally, the structured spectral filter 14 may be fabricated on the rear of the first X-ray detector 12 (with the term rear meaning the opposite face of the detector slab to that upon which the incident X-ray radiation impinges), or on the front of the second X-ray detector 16 (with the term front meaning the face of the second X-ray detector 16 facing the rear of the first X-ray detector 12). Fabricating the filter on one or other surfaces of the X-ray detector slabs simplifies the manufacturing process, bill of materials of a finished detector, and reduces mechanical alignment problems.

Optionally, the first region 14a of the structured spectral filter 14 may be provided on the rear of the first X-ray detector 12, and the second region 14b of the structured spectral filter may be provided on the front surface of the second X-ray filter 16, or vice versa, allowing for optical divergence (for example, owing to the distance of the detector from the focal spot of the X-ray tube) of the X-ray beam according to techniques known to a person skilled in the art.

Figure 5:
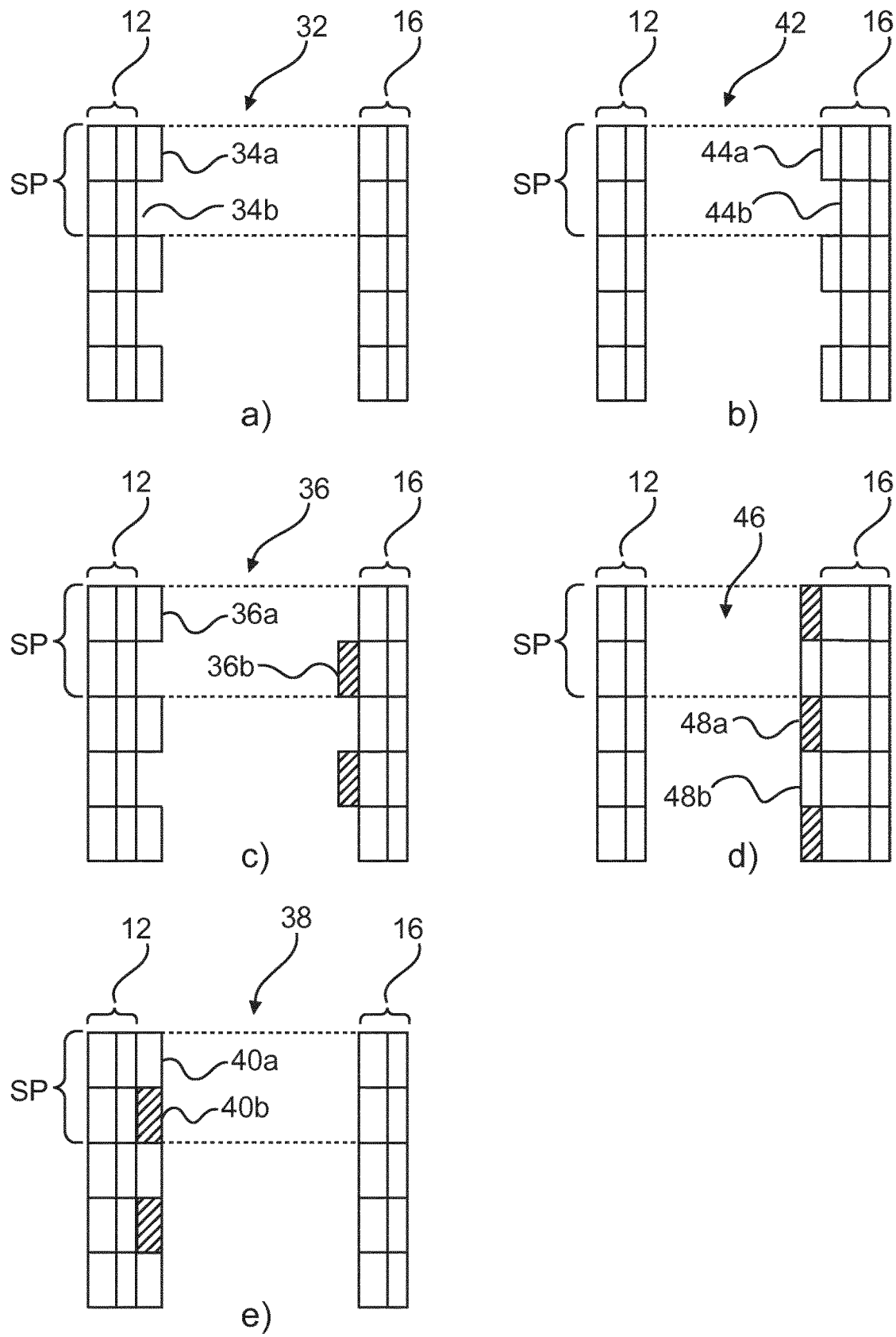
FIG. 5 illustrates schematic side views of five variant multi-spectral detector arrangements.

FIG. 5 illustrates a series of schematic side views of alternative arrangements of the structured spectral filter 14.

FIG. 5a illustrates a side view of a multi-spectral filter 32 having a first X-ray detector 12 and a second X-ray detector 16, with a structured filter fabricated directly onto the rear of the first X-ray detector 12. In this case, the structured filter assembly is provided as a first region 34a having greater thickness than a second region 34b. The second X-ray filter has no elements of the structured X-ray filter 14.

FIG. 5b illustrates a side view of a multi-spectral filter 42 having a first X-ray detector 12 and a second X-ray detector 16, with a structured filter fabricated directly onto the front of the second X-ray detector 16. In this case, the structured filter assembly is provided as a first region 44a having greater thickness than a second region 44b. The first X-ray filter 12 has no elements of the structured X-ray filter 14.

FIG. 5c illustrates a side view of a multi-spectral filter 36 having a first X-ray detector 12 and a second X-ray detector 16, with a structured filter fabricated as a first region 36a of a first material directly onto the rear of the first X-ray detector 12. A second region 36b of a second material with a different mass absorption coefficient to the first material is fabricated onto the front of the second X-ray detector 16.

FIG. 5d illustrates a side view of a multi-spectral filter 46 having a first X-ray detector 12 and a second X-ray detector 16, with a structured filter fabricated as a first region 48a of a first material directly onto the front of the second X-ray detector 16. A second region 48b of a second material with a different mass absorption coefficient to the first material is fabricated onto the front of the second X-ray detector 16.

FIG. 5e illustrates a side view of a multi-spectral filter 38 having a first X-ray detector 12 and a second X-ray detector 16, with a structured filter fabricated as a first region 40a of a first material directly onto the rear of the first X-ray detector 12. A second region 40b of a second material with a different mass absorption coefficient to the first material is fabricated onto the rear of the second X-ray detector 12.

For each superpixel, the regions having a different spectral characteristic (first region, second region, etc.) may be distributed according to different patterns within the superpixel.

Figure 6:
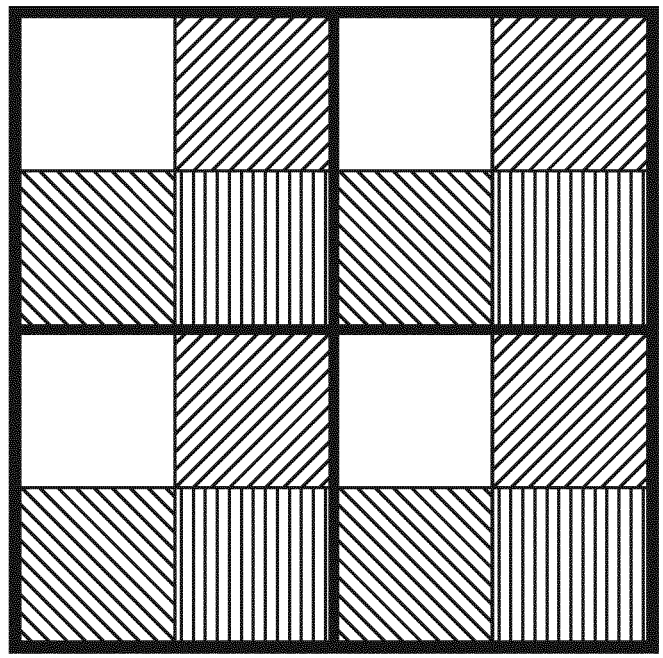
FIG. 6 schematically illustrates optional pixel and superpixel alignments.
Figure 6:
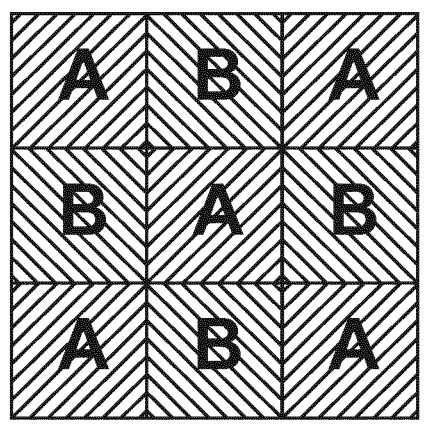
Figure 6:
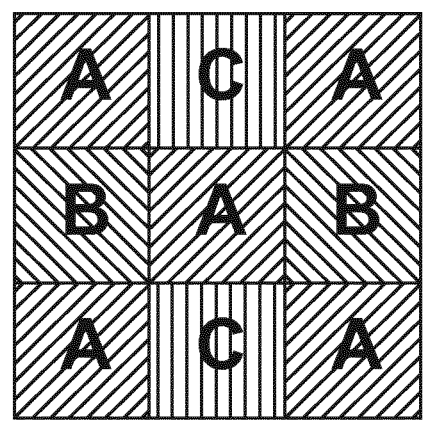

FIG. 6a illustrates one superpixel comprised of four pixels (defined by the bold line). Each pixel has four different materials, for example 3 metal filters of different materials and one polymer "no filter" region.

FIG. 6b provides an example of a superpixel with spatial spectral sampling based on a two-material (or thickness A, B) pattern. FIG. 6c provides an example of a superpixel with spatial spectral sampling using a three material (or thickness A, B, C) pattern.

As a practical example, a computer simulation was performed of a multi-spectral X-ray detector. A baseline, two-energy model was provided with an input spectrum modeled as a 120 kVp tube with a 2.5 mm thickness of Al filtration at the tube, and a 20 cm diameter water target.

Figure 9:
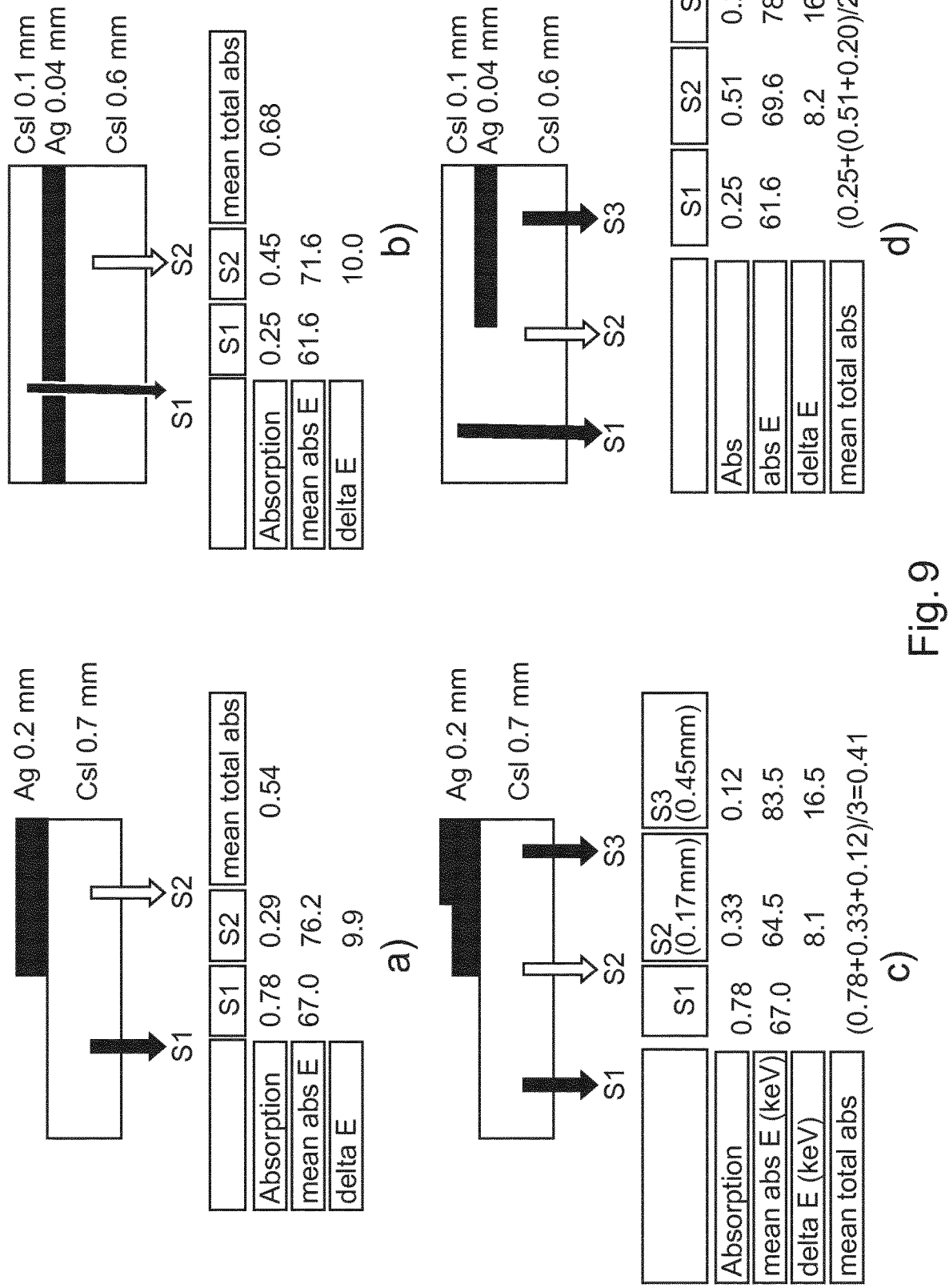
FIG. 9 demonstrates simulated results for techniques discussed herein.

FIG. 9 illustrates results of a computer simulation of the technique.

In the first and second examples of two-energy scenarios shown in FIGS. 9a) and 9b), a simulated input X-ray spectrum at 120 kVp, passing through a 2.5 mm aluminium filter and a 20 cm water model is applied to the structures shown in FIGS. 9a) and 9b), respectively. The structures shown in FIGS. 3 9a) and 9b) correspond to a conventional dual-layer multi-spectral detectors. The accompanying tables show the mean total absorption at different lateral regions of the illustrated conventional dual-layer multi-spectral detectors.

The third and fourth examples of three-energy scenarios based on a detector with a structured spectral filter as discussed in this application, shown in FIGS. 9c) and 9d).

FIGS. 9 a) and b) schematically illustrate two portions (S1, S2) of the X-ray beam that undergo different filtration (S1 unfiltered, S2 filtered). In FIG. 9a illustrating a pre-detector filter, and FIG. 9b illustrating an intermediate (non-structured) filter between the two parts of a traditional dual layer detector.

Setting the "spectral separation", i.e. the difference in mean energies of the absorbed X-ray beams S1 and S2, fixed to about 10 keV as example, for the first version (FIG. 9a) a 0.2 mm thick Ag filter is needed. In the second version, only 0.04 mm material is needed, but over the whole detector area. The mean total X-absorption in the first version is 54%, in contrast to 68% in the second case, thus the second case is much more dose efficient.

FIGS. 9 c) and 9 d) apply the same principle to the comparison of a pre-detector filter and a structured intermediate filter, the latter as discussed in this application. In the example, the structured filter consists of a first region with a silver (Ag) metal layer and a second region, where no metal is present.

As example, the thicknesses of the silver metal layers are calculated such that the energy separation between the first X-ray beam S1 and the second one S2 is 8.1 keV, and the separation of S1 and S3 is 16.1 keV. Metal thicknesses of 0.17 and 0.45 mm are needed in case of a pre-detector filter, but only 0.22 mm as intermediate filter. As a result, the mean X-ray absorption in the example having the pre-detector filter is only 41% of the incoming energy, whereas according to the option with the intermediate structured filter it is 61%. This means that, in order to achieve the same signal-to-noise ratio, 50% more X-ray dose would be needed with a pre-detector filter.

Figure 7:
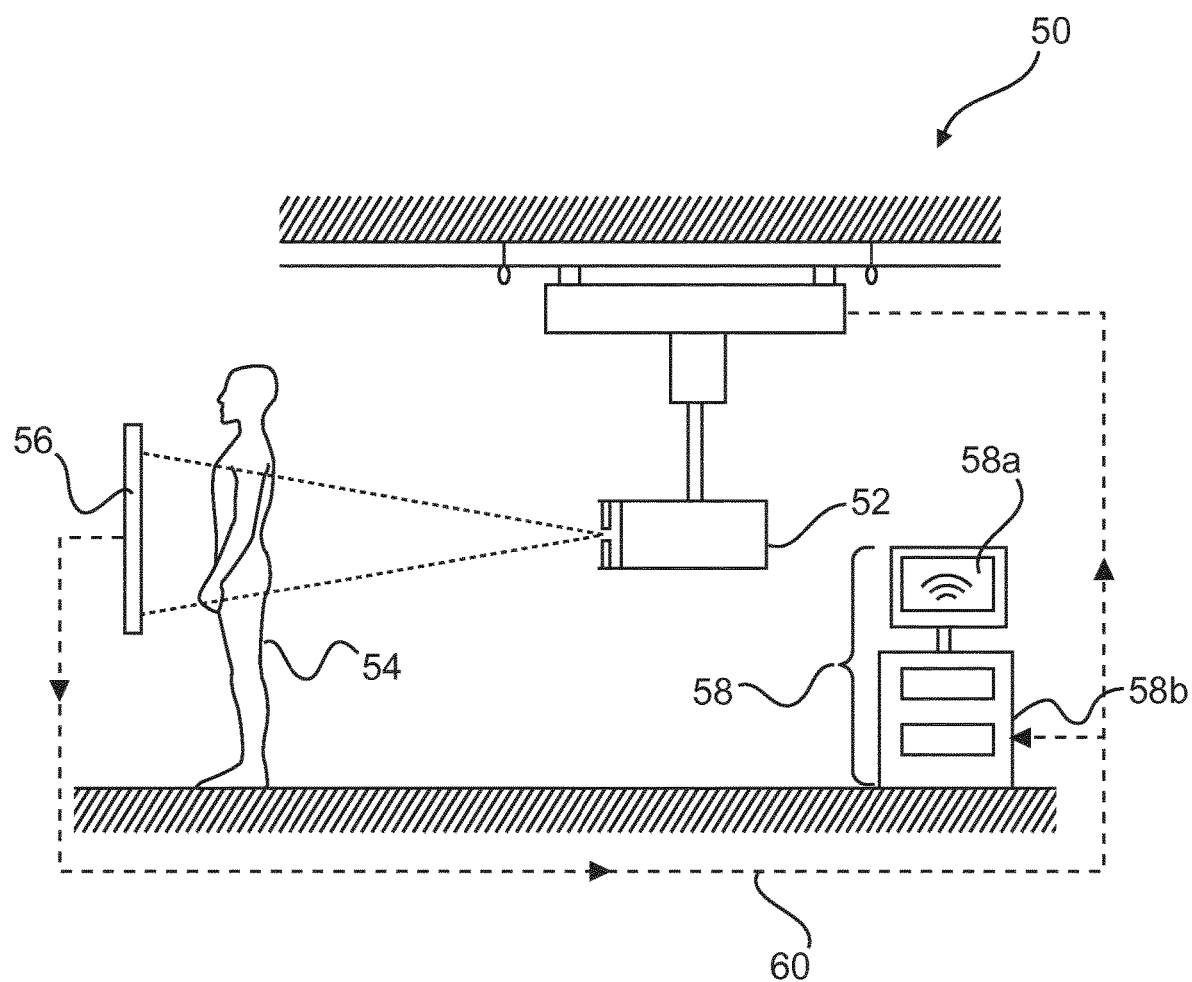
FIG. 7 illustrates a schematic view of an X-ray system according to the second aspect.

FIG. 7 illustrates a schematic of an X-ray imaging system 50 according to a second aspect. The system comprises:

an X-ray source 52 configured to emit X-ray radiation towards a region of interest 54;

a multi-spectral X-ray detector 56 according to the first aspect or its optional embodiments, configured to receive X-ray radiation which has passed through the region of interest 54; and an X-ray system control unit 58.

The X-ray system control unit 58 is configured to activate the X-ray source 52, 52a, 52b and to receive a first X-ray signal 60 from the first X-ray detector, and a second X-ray signal from the second X-ray detector, and to generate a multi-spectral image of the region of interest.

Optionally, the X-ray imaging system 50 is a X-ray airport baggage scanner, or an X-ray material analysis system.

Figure 8:
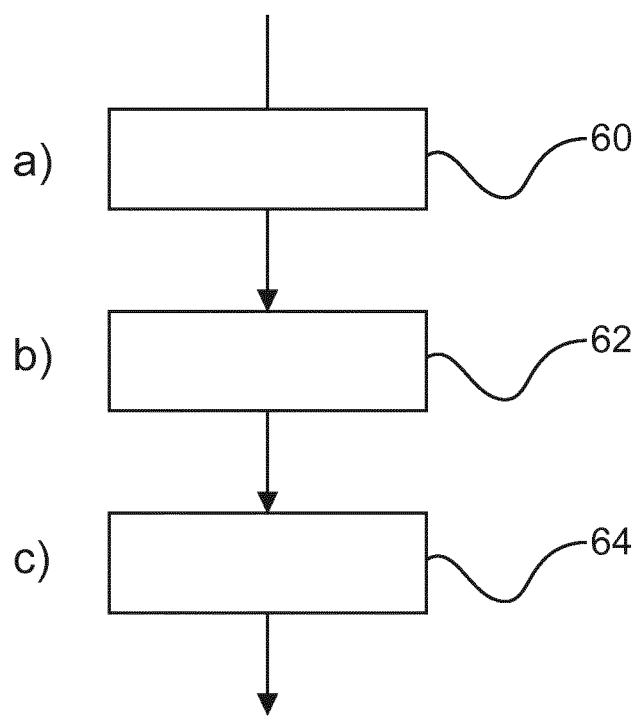
FIG. 8 illustrates a schematic of a method of manufacturing a multi-spectral X-ray detector according to a third aspect.

FIG. 8 illustrates a method of manufacturing a multi-spectral X-ray source according to the third aspect, comprising:

providing a first X-ray detector configured to receive incident X-ray radiation wherein the first X-ray detector comprises a contiguous plurality of pixels forming a superpixel;

providing a structured spectral filter configured to receive intermediate X-ray radiation propagating out of the first X-ray detector; and providing a second X-ray detector axially aligned with the first X-ray detector and the structured spectral filter configured to receive filtered intermediate X-ray radiation propagating out of the structured spectral filter;

wherein the second X-ray detector comprises a first plurality of pixels and a second plurality of pixels, both aligned to receive a portion of the filtered intermediate X-ray radiation having passed through the superpixel;

wherein the structured spectral filter comprises a filter structure aligned with pixels of the superpixel, and comprising a first region aligned with the first plurality of pixels of the second X-ray detector, and a second region aligned with the second plurality of pixels of the second X-ray detector, wherein the first region is configured to alter the spectrum of the intermediate X-ray radiation incident on the first plurality of pixels of the second X-ray detector to form the filtered intermediate X-ray radiation.

The provision of first and second X-ray detectors is a matter of arranging previously manufactured X-ray detector units (indirect of direct conversion types). The structured spectral filter may, for example, be provided as a discrete part in-between the first and second X-ray detectors. Optionally, the structured spectral filter is fabricated by micro-machining, 3D printing, or etching a metal sheet. Optionally, the sheet is planarised with a polymer. Alternatively, a structured spectral filter is provided as a matrix of first and second regions of different materials, and joined together by sintering. The first and second materials can be deposited onto a substrate using plasma vapour deposition, or chemical vapour deposition, for example. Similar process apply to the formation of the structured spectral filter on the rear of the first X-ray detector or the front of the second X-ray detector.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A multi-spectral X-ray detector, comprising:
a first X-ray detector configured to receive X-ray radiation;
a structured spectral filter configured to receive the X-ray radiation propagating out of the first X-ray detector; and
a second X-ray detector axially aligned with the first X-ray detector and the structured spectral filter, and configured to receive the filtered X-ray radiation propagating out of the structured spectral filter;
wherein the first X-ray detector comprises a contiguous plurality of pixels forming a superpixel;

wherein the second X-ray detector comprises a first plurality of pixels and a second plurality of pixels, each aligned to receive a portion of the filtered X-ray radiation having passed through the superpixel;

wherein the structured spectral filter comprises a filter structure aligned with pixels of the superpixel, and comprising a first region aligned with the first plurality of pixels of the second X-ray detector, and a second region aligned with the second plurality of pixels of the second X-ray detector, wherein the first region is configured to alter the spectrum of the X-ray radiation incident on the first plurality of pixels of the second X-ray detector to form the filtered X-ray radiation; and wherein the contiguous plurality of pixels forming the superpixel of the first X-ray detector are in alignment with at least the first and the second pluralities of pixels of the second X-ray detector, so as to provide, when the multi-spectral X-ray detector is in use, at least three X-ray spectra per superpixel.

2. The multi-spectral X-ray detector according to claim 1, wherein the second region of the structured spectral filter is configured to alter the spectrum of the X-ray radiation directed towards the second plurality of pixels of the second X-ray detector differently to the alteration to the X-ray radiation made by the first region of the structured spectral filter.

3. The multi-spectral X-ray detector according to claim 1, wherein the first plurality of pixels of the second X-ray detector and second plurality of pixels of the second X-ray detector are coplanar.

4. The multi-spectral X-ray detector according to claim 1, wherein the structured spectral filter comprises a plurality of third filter regions, configured to alter the spectrum of the X-ray radiation incident on the structured spectral filter differently to the alteration made by the first and second regions of the structured spectral filter.

5. The multi-spectral X-ray detector according to claim 1, wherein the pixels of the superpixel of the first X-ray detector are configured to detect a primary X-ray spectrum; and wherein the first plurality of pixels of the second X-ray detector are configured to detect a second X-ray spectrum using a pixel of the second X-ray detector aligned with the first region of the structured spectral filter, and to detect a third X-ray spectrum using a pixel of the second X-ray detector aligned with the second region of the structured spectral filter.

6. The multi-spectral X-ray detector according to claim 1, wherein the first region of the structured spectral filter has a different thickness than the second region of the structured spectral filter.

7. The multi-spectral X-ray detector according to claim 1, wherein the thickness of the first region of the structured spectral filter is between 0.05 mm to 0.7 mm, and the thickness of the second region of the structured spectral filter is between 0.2 mm to 2 mm.

8. The multi-spectral X-ray detector according to claim 1, wherein the structured spectral filter further comprises a planarization region having a low X-ray absorption relative to the first and second regions of the structured spectral filter, to equalize an outer thickness of the structured spectral filter.

9. The multi-spectral X-ray detector according to claim 8, wherein the planarization region comprises a polymer.

10. The multi-spectral X-ray detector according to claim 1, wherein the first region of the structured spectral filter comprises a material having a different mass absorption coefficient than the material comprising the second region of the structured spectral filter.

11. The multi-spectral X-ray detector according to claim 1, wherein material of the first and/or second regions comprises at least one of copper, silver, aluminum, tin, and an alloy thereof.

12. The multi-spectral X-ray detector according to claim 1, wherein the structured spectral filter is fabricated on a rear surface of the first X-ray detector or on a front surface of the second X-ray detector.

13. The multi-spectral X-ray detector according to claim 1, wherein the first region is fabricated on a rear surface of the first X-ray detector, and the second region is fabricated on a front surface of the second X-ray detector.

14. An X-ray imaging system, comprising:
an X-ray source configured to emit X-ray radiation towards a region of interest;
a multi-spectral X-ray detector comprising:
a first X-ray detector configured to receive the X-ray radiation;
a structured spectral filter configured to receive the X-ray radiation propagating out of the first X-ray detector; and
a second X-ray detector axially aligned with the first X-ray detector and the structured spectral filter, and configured to receive the filtered X-ray radiation propagating out of the structured spectral filter;
wherein the first X-ray detector comprises a contiguous plurality of pixels forming a superpixel;
wherein the second X-ray detector comprises a first plurality of pixels and a second plurality of pixels, each aligned to receive a portion of the filtered X-ray radiation having passed through the superpixel;
wherein the structured spectral filter comprises a filter structure aligned with pixels of the superpixel and comprising a first region aligned with the first plurality of pixels of the second X-ray detector, and a second region aligned with the second plurality of pixels of the second X-ray detector, wherein the first region is configured to alter the spectrum of the X-ray radiation incident on the first plurality of pixels of the second X-ray detector to form the filtered X-ray radiation; and
wherein the contiguous plurality of pixels forming the superpixel of the first X-ray detector are in alignment with at least the first and the second pluralities of pixels of the second X-ray detector, so as to provide when the multi-spectral X-ray detector is in use, at least three X-ray spectra per superpixel; and
X-ray system control circuitry configured to activate the X-ray source, receive a first X-ray signal from the first X-ray detector, and a second X-ray signal from the second X-ray detector, and generate a multi-spectral image of the region of interest.

15. The X-ray imaging system according to claim 14, wherein the second region of the structured spectral filter is configured to alter the spectrum of the X-ray radiation directed towards the second plurality of pixels of the second X-ray detector differently to the alteration to the X-ray radiation made by the first region of the structured spectral filter.

16. The X-ray imaging system according to claim 14, wherein the first plurality of pixels of the second X-ray detector and second plurality of pixels of the second X-ray detector are coplanar.

17. The X-ray imaging system according to claim 14, wherein the structured spectral filter comprises a plurality of third filter regions, configured to alter the spectrum of the X-ray radiation incident on the structured spectral filter differently to the alteration made by the first and second regions of the structured spectral filter.

18. A method for manufacturing a multi-spectral X-ray detector, comprising:
  providing a first X-ray detector configured to receive X-ray radiation, wherein the first X-ray detector comprises a contiguous plurality of pixels forming a superpixel;
  providing a structured spectral filter configured to receive the X-ray radiation propagating out of the first X-ray detector; and
  providing a second X-ray detector axially aligned with the first X-ray detector and the structured spectral filter and configured to receive the filtered X-ray radiation propagating out of the structured spectral filter;
  wherein the second X-ray detector comprises a first plurality of pixels and a second plurality of pixels aligned to receive a portion of the filtered X-ray radiation having passed through the superpixel;
  wherein the structured spectral filter comprises a filter structure aligned with pixels of the superpixel, and comprising a first region aligned with the first plurality of pixels of the second X-ray detector, and a second region aligned with the second plurality of pixels of the second X-ray detector, wherein the first region is configured to alter the spectrum of the X-ray radiation incident on the first plurality of pixels of the second X-ray detector to form the filtered X-ray radiation; and
  wherein the contiguous plurality of pixels forming the superpixel of the first X-ray detector are in alignment with at least the first and the second pluralities of the second X-ray detector, so as to provide, when the multi-spectral X-ray detector is in use, at least three X-ray spectra per superpixel.

* * * * *